US010948073B2

(12) United States Patent
Kamio

(10) Patent No.: US 10,948,073 B2
(45) Date of Patent: Mar. 16, 2021

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 16/529,904

(22) Filed: Aug. 2, 2019

(65) Prior Publication Data

US 2019/0353242 A1 Nov. 21, 2019

Related U.S. Application Data

(63) Continuation of application No. PCT/JP2018/005459, filed on Feb. 16, 2018.

(30) Foreign Application Priority Data

Feb. 21, 2017 (JP) .............................. JP2017-029653

(51) Int. Cl.
*F16H 61/28* (2006.01)
*F16H 61/02* (2006.01)
*F16H 61/00* (2006.01)
*F16H 61/32* (2006.01)

(52) U.S. Cl.
CPC ......... *F16H 61/0204* (2013.01); *F16H 61/28* (2013.01); *F16H 2061/0078* (2013.01); *F16H 2061/0087* (2013.01); *F16H 2061/326* (2013.01)

(58) Field of Classification Search
CPC ................. F16H 61/0204; F16H 61/28; F16H 2061/0078; F16H 2061/326; F16H 61/32; H02P 6/30; H02P 27/08

USPC ...................................................... 701/60, 64
See application file for complete search history.

(56) References Cited

U.S. PATENT DOCUMENTS

2005/0174084 A1 8/2005 Nakai et al.
2017/0307072 A1* 10/2017 Yamada .................. F16H 61/32
2019/0202417 A1* 7/2019 Kamio .................... B60T 1/005

FOREIGN PATENT DOCUMENTS

| JP | 2017-194147 | 10/2017 | |
| WO | WO-2017179337 A1 * | 10/2017 | ............. F16H 59/08 |
| WO | WO-2018163789 A1 * | 9/2018 | ........... F16H 59/105 |
| WO | WO-20193131331 A1 * | 7/2019 | ............. F16H 61/32 |

OTHER PUBLICATIONS

English Translation of WO2017179337A1; http://translatinportal.epo.org; Nov. 25, 2020 (Year: 2020).*

* cited by examiner

*Primary Examiner* — Roger L Pang
(74) *Attorney, Agent, or Firm* — Nixon & Vanderhye P.C.

(57) ABSTRACT

A shift range control device switches a shift range by controlling the driving operation of a motor. When a difference between a target angle at which the motor is to be stopped and an actual angle becomes smaller than an angle determination threshold, the shift range control device switches from a feedback control to a control with a fixed duty. When the motor reverses, the shift range control device switches from the control with the fixed duty to a stationary phase energization control for energizing a stationary phase of the motor.

6 Claims, 13 Drawing Sheets

SHIFT RANGE CONTROL DEVICE

CROSS REFERENCE TO RELATED APPLICATION

The present application is a continuation application of International Patent Application No. PCT/JP2018/005459 filed on Feb. 16, 2018, which designated the U.S. and claims the benefit of priority from Japanese Patent Application No. 2017-29653 filed on Feb. 21, 2017. The entire disclosures of all of the above applications are incorporated herein by reference.

TECHNICAL FIELD

The present disclosure relates to relates to a shift range control device.

BACKGROUND

A shift range switching device has been known which switches a shift range by controlling a motor in response to a shift range switching request from a driver. For example, in Patent Literature 1, a switched reluctance motor is used as a driving source of a shift range switching mechanism. Hereinafter, the switched reluctance motor is referred to as an "SR motor".

SUMMARY

According to an example embodiment, a shift range control device switches a shift range by controlling the driving operation of a motor. When a difference between a target angle at which the motor is to be stopped and an actual angle becomes smaller than an angle determination threshold, the shift range control device switches from a feedback control to a control with a fixed duty. When the motor reverses, the shift range control device switches from the control with the fixed duty to a stationary phase energization control for energizing a stationary phase of the motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An SR motor that does not use a permanent magnet has a simple configuration. A motor using a permanent magnet such as a DC brushless motor, for example, has a high responsiveness compared to the SR motor, but overshoot may occur when the motor is stopped. In view of these points, a shift range control device is provided to be capable of appropriately controlling the drive of a motor related to the switching of a shift range.

The shift range control device according to an example embodiment switches a shift range by controlling the driving operation of a motor, and includes a first switching control unit, a reverse determination unit, and a second switching control unit. When a difference between a target angle at which the motor is to be stopped and an actual angle becomes smaller than an angle determination threshold, the first switching control unit switches from a feedback control to a control with a fixed duty. The reverse determination unit determines whether the motor reverses. When the reverse determination unit determines that the motor reverses, the second switching control unit switches from the control with the fixed duty to a stationary phase energization control for energizing a stationary phase of the motor. This makes it possible to improve the responsiveness, to reduce an overshoot, and to appropriately stop the motor at a target position.

Hereinafter, a shift range control device will be described with reference to the drawings.

First Embodiment

Figure 1:
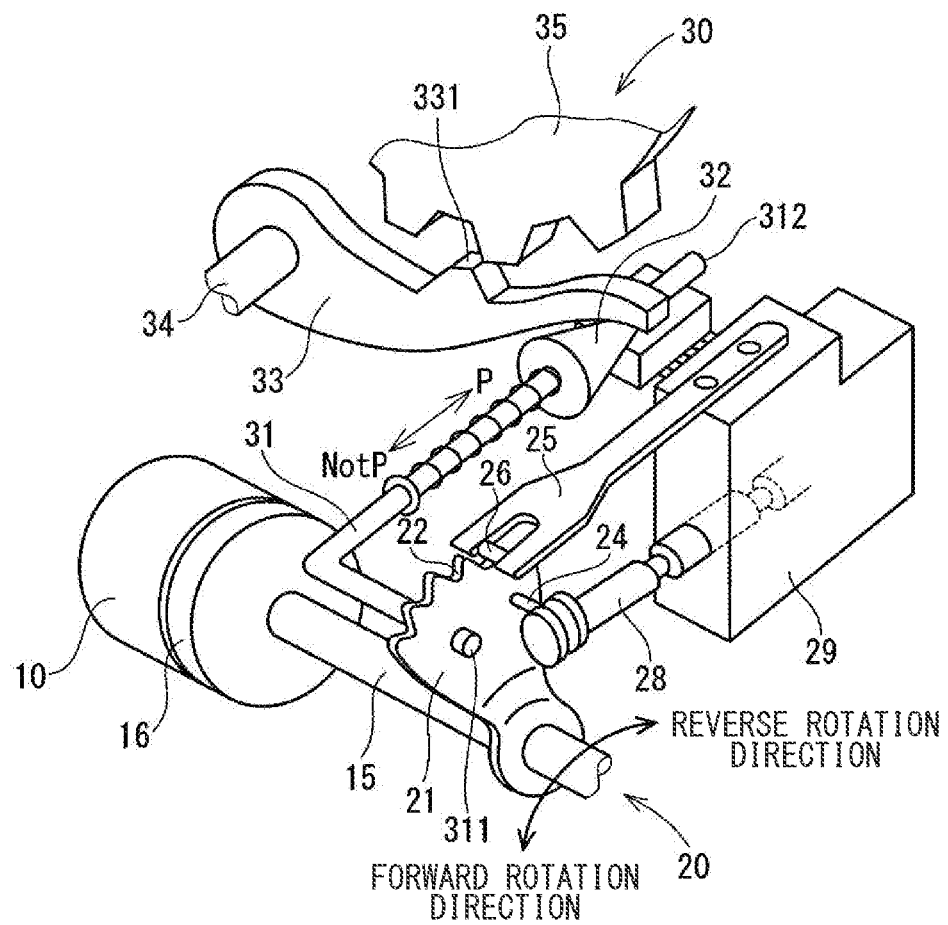
FIG. 1 is a perspective view showing a shift-by-wire system according to a first embodiment.
Figure 2:
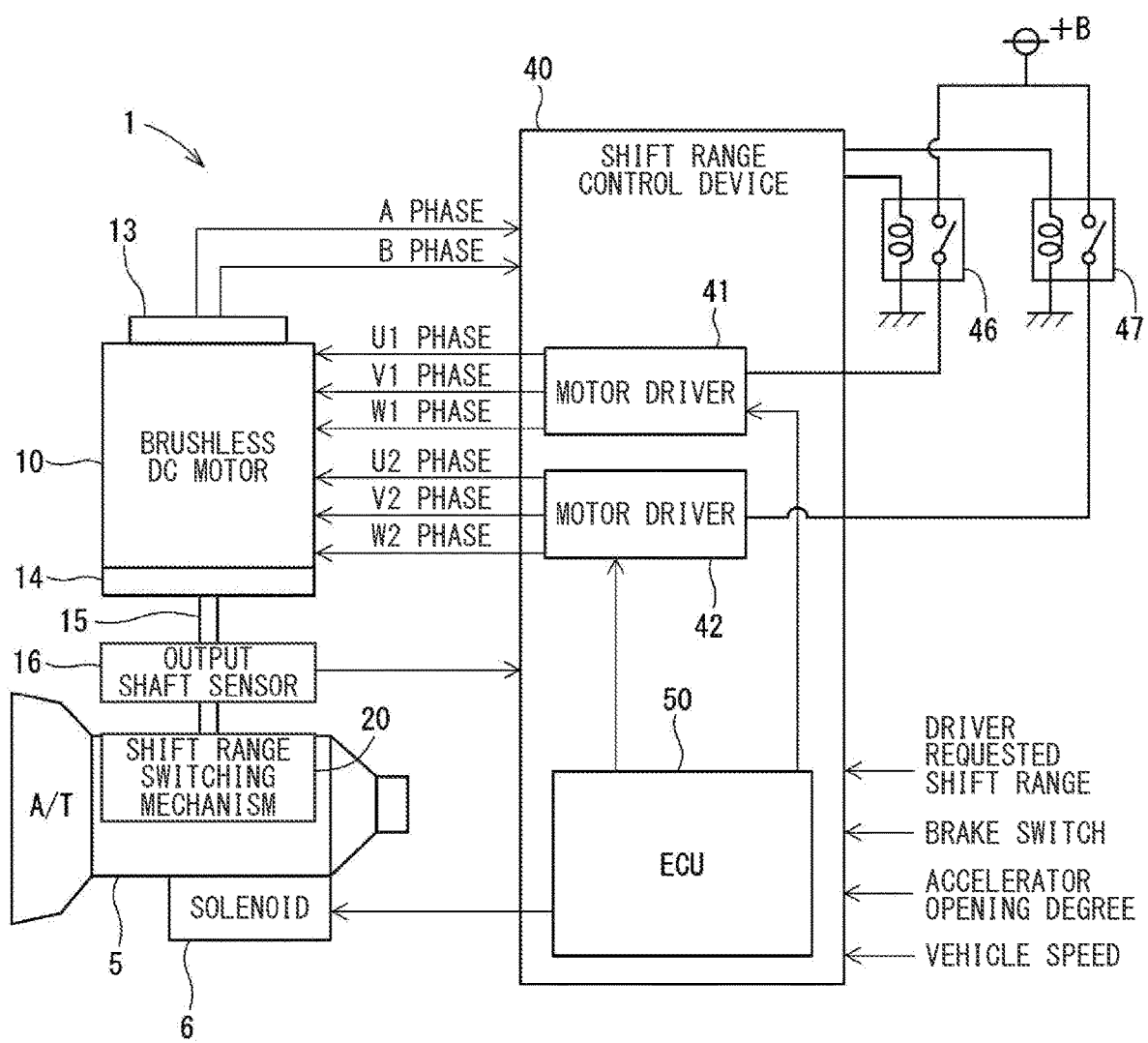
FIG. 2 is a schematic configuration diagram showing the shift-by-wire system according to the first embodiment.
Figure 3:
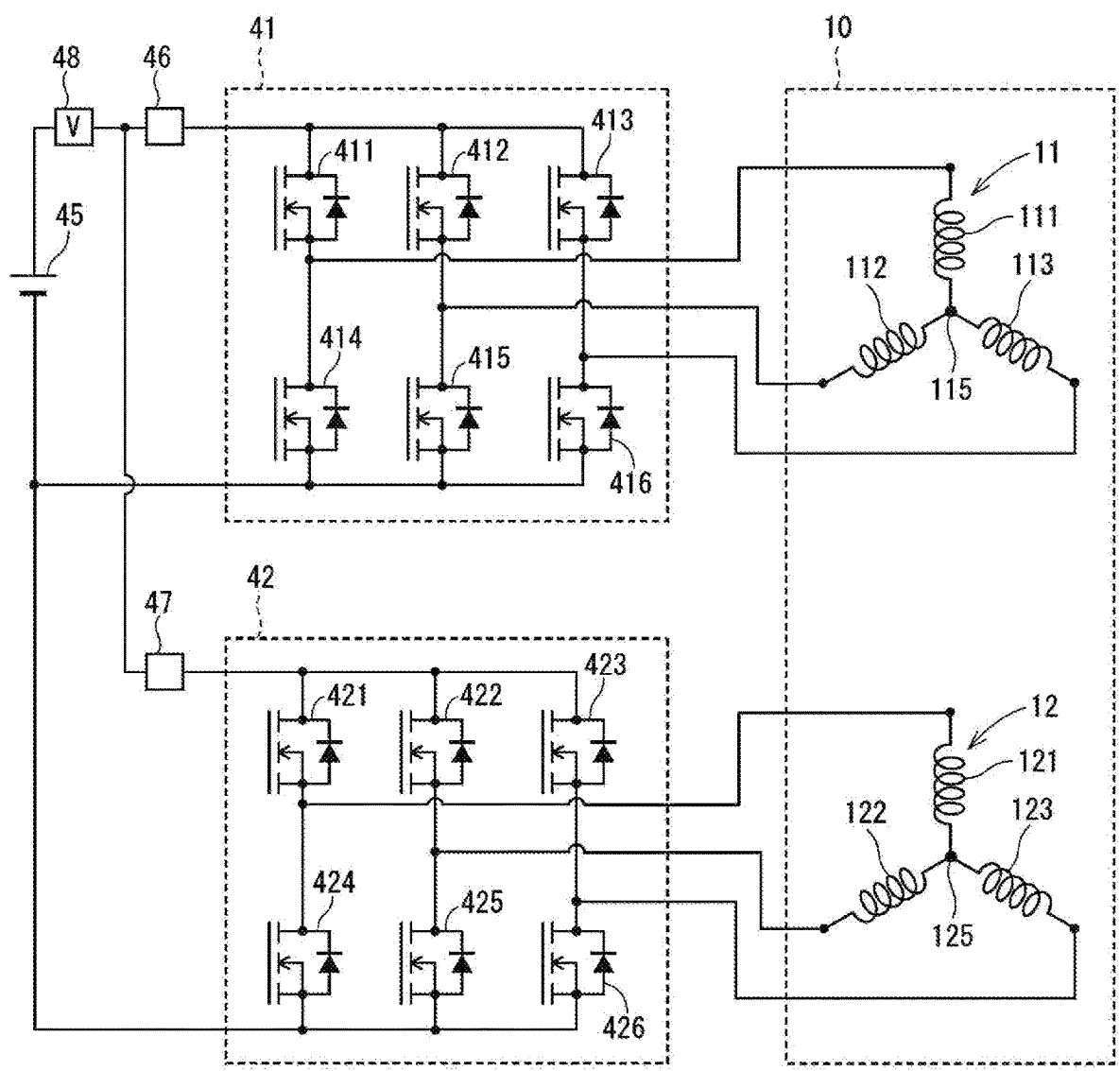
FIG. 3 is a circuit diagram showing a motor and a motor driver according to the first embodiment.

A shift range control device according to a first embodiment is shown in FIGS. 1 to 11. As shown in FIGS. 1 and 2, a shift-by-wire system 1 includes a motor 10, a shift range switching mechanism 20, a parking lock mechanism 30, a shift range control device 40, and the like. The motor 10 rotates upon receiving an electric power from a battery 45 (refer to FIG. 3) mounted on a vehicle (not shown), and functions as a driving source of the shift range switching mechanism 20. The motor 10 can change the magnitude of a current by a feedback control and can change a command for each phase. The motor 10 according to the present embodiment is a DC brushless motor of a permanent magnet type. As shown in FIG. 3, the motor 10 has two winding sets 11 and 12. The first winding set 11 includes a U1 coil 111, a V1 coil 112, and a W1 coil 113. The second winding set 12 includes a U2 coil 121, a V2 coil 122, and a W2 coil 123.

As shown in FIG. 2, the encoder 13 detects a rotational position of a rotor (not shown) of the motor 10. The encoder 13 is, for example, a magnetic rotary encoder, and includes a magnet that rotates integrally with the rotor, a Hall IC for magnetic detection, and the like. The encoder 13 outputs pulse signals of A-phase and B-phase at every predetermined angle in synchronization with the rotation of the rotor. The speed reducer 14 is provided between a motor shaft of the motor 10 and an output shaft 15, decelerates the rotation of the motor 10, and outputs the decelerated rotation to the output shaft 15. As a result, the rotation of the motor 10 is transmitted to the shift range switching mechanism 20. The power shaft 15 is provided with an output shaft sensor 16 for detecting an angle of the output shaft 15. The output shaft sensor 16 is, for example, a potentiometer.

As shown in FIG. 1, the shift range switching mechanism 20 includes a detent plate 21, a detent spring 25, and the like, and transmits a rotational driving force output from the speed reducer 14 to a manual valve 28 and a parking lock mechanism 30. The detent plate 21 is fixed to the output shaft 15 and driven by the motor 10. In the present embodiment, a direction in which the detent plate 21 is away from a base of the detent spring 25 is defined as a forward rotation direction and a direction approaching the base portion is defined as a reverse rotation direction.

The detent plate 21 is provided with a pin 24 projecting parallel to the output shaft 15. The pin 24 is connected to a manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in an axial direction, a hydraulic supply path to a hydraulic clutch (not shown) is switched, and an engagement state of the hydraulic clutch is switched, thereby changing the shift range. The detent spring 25 side of the detent plate 21 is provided with four recess portions 22 for holding the manual valve 28 at positions corresponding to the respective ranges. The recess portions 22 correspond to the respective ranges of D, N, R, and P from a base portion side of the detent spring 25.

The detent spring 25 is an elastically deformable plate-like member, and is provided with a detent roller 26 at a tip of the detent spring 25. The detent roller 26 fits into one of the recess portions 22. The detent spring 25 urges the detent roller 26 toward the center of rotation of the detent plate 21. When a predetermined or more rotating force is applied to the detent plate 21, the detent spring 25 elastically deforms, and the detent roller 26 moves on the recess portions 22. When the detent roller 26 is fitted into any one of the recess portions 22, the swinging motion of the detent plate 21 is regulated, the axial position of the manual valve 28 and the state of the parking lock mechanism 30 are determined, and the shift range of an automatic transmission 5 is fixed.

The parking lock mechanism 30 includes a parking rod 31, a conical body 32, a parking lock pawl 33, a shaft portion 34, and a parking gear 35. The parking rod 31 is formed in a substantially L-shape, and one end 311 of the parking rod 31 is fixed to the detent plate 21. The conical body 32 is provided on the other end 312 side of the parking rod 31. The conical body 32 is formed so as to decrease in diameter toward the other end 312. When the detent plate 21 swings in the reverse rotation direction, the conical body 32 moves in a direction of an arrow P.

The parking lock pawl 33 abuts against a conical surface of the conical body 32, and a projection portion 331 that can mesh with the parking gear 35 is provided on the parking gear 35 side of the parking lock pawl 33 which is provided so as to be swingable about the shaft portion 34. When the detent plate 21 rotates in the reverse rotation direction and the conical body 32 moves in the arrow P direction, the parking lock pawl 33 is pushed up, and the projection portion 331 and the parking gear 35 mesh with each other. On the other hand, when the detent plate 21 rotates in the forward rotational direction and the conical body 32 moves in a direction of an arrow non-P, the engagement between the projection portion 331 and the parking gear 35 is released.

The parking gear 35 is provided on an axle (not shown) so as to be engageable with the projection portion 331 of the parking lock pawl 33. When the parking gear 35 and the projection portion 331 are engaged with each other, the rotation of the axle is regulated. When the shift range is the NotP range other than the shift range P, the parking gear 35 is not locked by the parking lock pawl 33, and the rotation of the axle is not hindered by the parking lock mechanism 30. When the shift range is the P range, the parking gear 35 is locked by the parking lock pawl 33, and the rotation of the axle is regulated.

As shown in FIGS. 2 and 3, the shift range control device 40 includes motor drivers 41 and 42, an ECU 50, and the like. The motor driver 41 is a three-phase inverter for switching the energization of the first winding set 11, and switching elements 411 to 416 are bridge-connected to each other. One end of the U1 coil 111 is connected to a connection point of the U-phase switching elements 411 and 414 which are paired with each other. One end of the V1 coil 112 is connected to a connection point of the V-phase switching elements 412 and 415 which are paired with each other. One end of the W1 coil 113 is connected to a connection point of the W-phase switching elements 413 and 416 which are paired with each other. The other ends of the coils 111 to 113 are connected to each other by a connection portion 115.

The motor driver 42 is a three-phase inverter for switching the energization of the second winding set 12, and switching elements 421 to 426 are bridge-connected to each other. One end of the U2 coil 121 is connected to a connection point of the U-phase switching elements 421 and 424 which are paired with each other. One end of the V2 coil 122 is connected to a connection point of the V-phase switching elements 422 and 425 which are paired with each other. One end of the W2 coil 123 is connected to a connection point of the W-phase switching elements 423 and 426 which are paired with each other. The other ends of the coils 121 to 123 are connected to each other by a connection unit 125. The switching elements 411 to 416 and 421 to 426 according to the present embodiment are MOSFET, but may be formed of other elements such as an IGBT.

A motor relay 46 is provided between the motor driver 41 and the battery 45. A motor relay 47 is provided between the motor driver 42 and the battery 45. The motor relays 46 and 47 are turned on when a start switch such as an ignition switch or the like is turned on, and an electric power is supplied to the motor 10 side. The motor relays 46 and 47 are turned off when the start switch is turned off, and the supply of the electric power to the motor 10 side is cut off. A voltage sensor 48 for detecting a battery voltage V is provided on a high potential side of the battery 45. The shift range control device 40 is provided with a current sensor (not shown) for detecting a motor current Im.

The ECU 50 controls the driving of the motor 10 by controlling on/off operations of the switching elements 411 to 416 and 421 to 426. The ECU 50 controls the drive of the shift hydraulic control solenoids 6 based on a vehicle speed, an accelerator opening degree, a driver requested shift range, and the like. A transmission stage is controlled by controlling the shift hydraulic control solenoids 6. The number of the shift hydraulic control solenoids 6 corresponding to the number of transmission stages and the like is provided. In the present embodiment, one ECU 50 controls the driving of the motor 10 and the solenoids 6, but a motor control ECU for controlling the motor 10 and a solenoid control AT-ECU may be separated from each other. Hereinafter, the drive control of the motor 10 will be mainly described.

Figure 4:
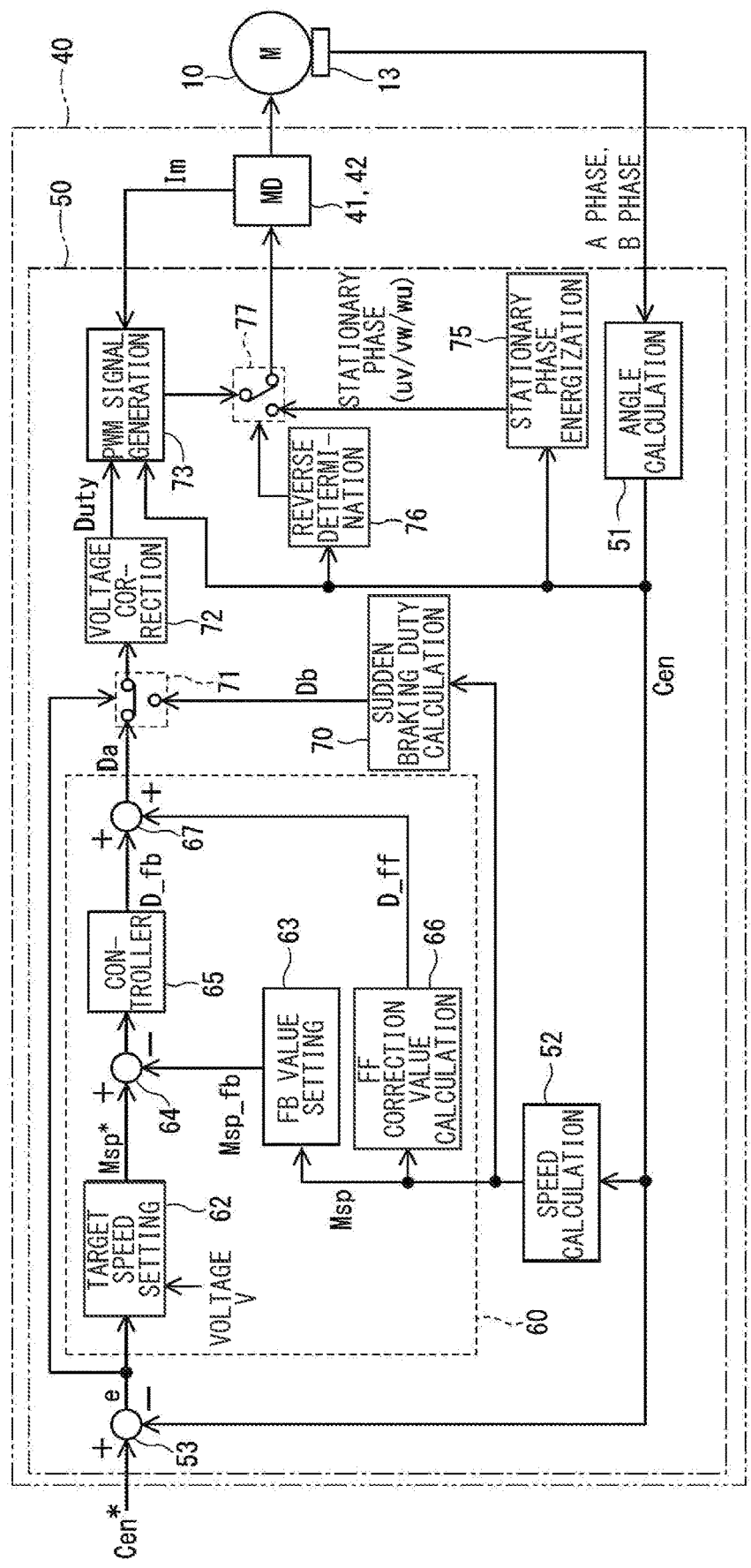
FIG. 4 is a block diagram showing a shift range control device according to the first embodiment.
Figure 5:
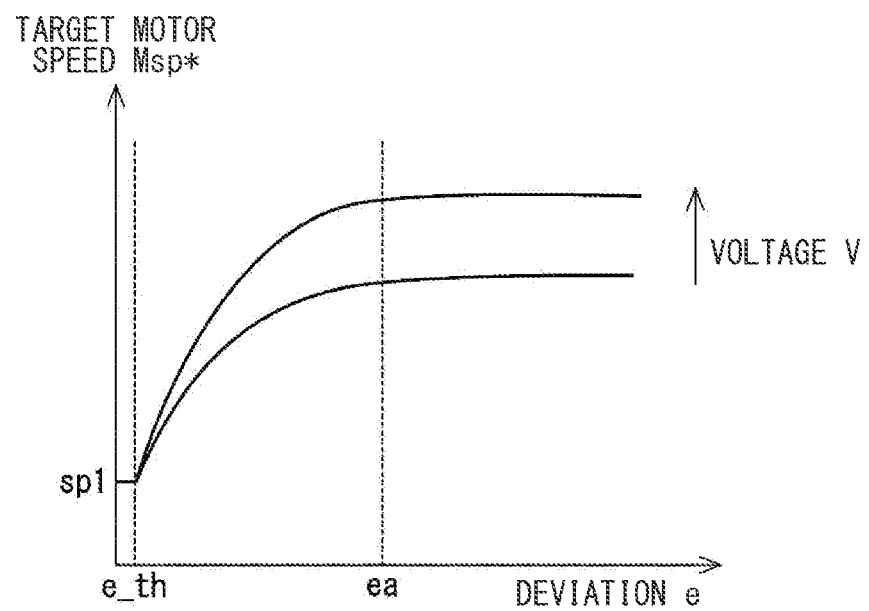
FIG. 5 is an illustrative diagram illustrating a target speed setting according to the first embodiment.

As shown in FIG. 4, the ECU 50 includes an angle calculation unit 51, a speed calculation unit 52, an angle deviation calculation unit 53, a feedback control unit 60, a sudden braking duty calculation unit 70, a first switching control unit 71, a stationary phase energization control unit 75, a reverse determination unit 76, a second switching control unit 77, and the like, and is configured mainly by a microcomputer and the like. The processing in the ECU 50 may be software processing by executing programs stored in advance in a tangible memory such as a ROM by a CPU, or hardware processing by a dedicated electronic circuit.

The angle calculation unit 51 calculates an actual count value Cen, which is a count value of the encoder 13, based on the pulses of the A-phase and the B-phase output from the encoder 13. The actual count value Cen is a value corresponding to an actual mechanical angle and an electrical angle of the motor 10. The speed calculation unit 52 calculates a motor speed Msp, which is the rotation speed of the motor 10, based on the actual count value Cen. The angle deviation calculation unit 53 calculates a difference between a target count value Cen* and the actual count value Cen according to the driver requested shift range input by operating a shift lever (not shown) or the like. Hereinafter, an absolute value of a difference between the target count value Cen* and the actual count value Cen is referred to as an angle deviation e. In the present embodiment, the actual count value Cen is set to the "actual angle" and the target count value Cen* is set to the "target angle".

The feedback control unit 60 includes a target speed setting unit 62, a feedback value setting unit 63, a speed deviation calculation unit 64, a controller 65, a feedforward correction value calculation unit 66, a feedforward term correction unit 67, and the like. Hereinafter, the feedback is referred to as "FB" and the feedforward is referred to as "FF" as appropriate.

The target speed setting unit 62 calculates a target motor speed Msp*, which is a target speed of the motor 10, based on an angle deviation e. The target motor speed Msp* is set to be larger as the angle deviation e is larger when the angle deviation e is equal to or smaller than a predetermined value ea based on, for example, a map shown in FIG. 5, and is set to be a predetermined maximum value when the angle deviation e is larger than the predetermined value ea. In addition, the angle deviation e is set to a set speed sp1 (for example, 1000 rpm) at an angle determination threshold e_th. The target motor speed Msp* is set so as to increase as the battery voltage V increases.

When a control state of the motor 10 is a mode 2 or a mode 3 to be described later, that is, a steady-state control or a deceleration control, the FB value setting unit 63 performs a phase advance compensation for advancing a phase of the motor speed Msp, and sets a speed phase advance value Msp_pl as a speed feedback value Msp_fb. When the control state of the motor 10 is the mode 1, that is, the acceleration control, the FB value setting unit 63 does not perform the phase advance compensation, and sets the motor speed Msp to the speed feedback value Msp_fb. The speed phase advance value Msp_pl is also included in a concept of the "motor speed".

The speed deviation calculation unit 64 calculates a speed deviation ΔMsp between the target motor speed Msp* and the speed feedback value Msp-fb. In order to make the target motor speed Msp* coincide with the speed feedback value Msp_fb, the controller 65 calculates an FB duty D_fb by, for example, a P control or an PI control so that the speed deviation ΔMsp becomes 0.

The FF correction value calculation unit 66 calculates an FF duty D_ff according to the control state of the motor 10. The FF duty D_ff at the time of the acceleration control is a maximum acceleration duty calculated based on a map or the like shown in the FIG. 6A, and becomes larger as the motor speed Msp becomes higher. According to the present embodiment, the FF duty D_ff is calculated so that the FF duty becomes the maximum duty until the motor speed Msp becomes equal to or higher than the target motor speed Msp*. The FF duty D_ff at the time of the steady-state control is set to a speed maintenance duty calculated based on a map or the like shown in the FIG. 6B. The speed maintenance duty is a duty for maintaining the motor speed Msp at the time of no load, and increases as the motor speed Msp increases. The FF duty D_ff at the time of deceleration control is a deceleration correction duty calculated based on a map or the like shown in the FIG. 6C. The deceleration correction duty is a correction duty for realizing the target motor speed Msp*. The deceleration correction duty is a negative value when the motor 10 rotates in a forward direction, and becomes smaller as the motor speed Msp increases more. In other words, as the motor speed Msp increases, the deceleration correction duty becomes larger as an absolute value.

Figure 6A:
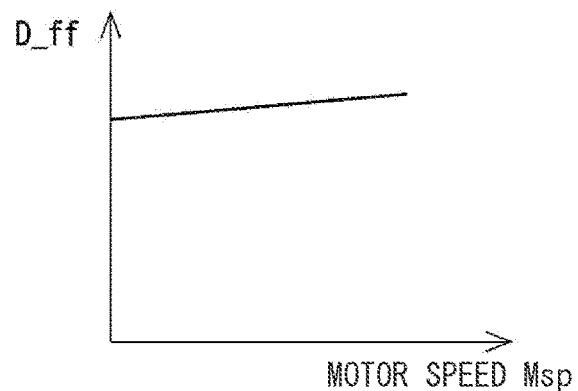
FIG. 6A is an illustrative diagram illustrating an FF duty at the time of an acceleration control according to the first embodiment.
Figure 6B:
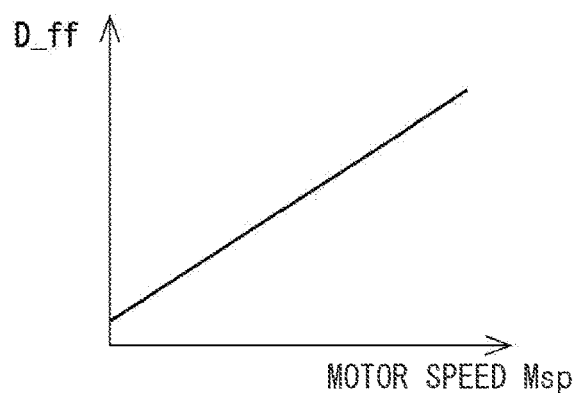
FIG. 6B is an illustrative diagram illustrating the FF duty at the time of a steady-state control according to the first embodiment.
Figure 6C:
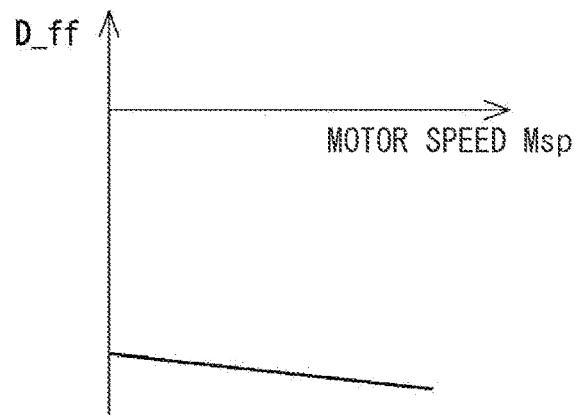
FIG. 6C is an illustrative diagram illustrating the FF duty at the time of a deceleration control according to the first embodiment.

In FIGS. 6A, 6B and 6C, when the motor 10 is rotating in the forward direction and the motor 10 is rotating in the reverse direction, the sign of a value of the FF duty D-ff is reversed. The same applies to a fixed duty Db to be described later. According to the present embodiment, the FF duty D_ff is calculated based on the motor speed Msp, but instead of the motor speed Msp, the FF duty D_ff may be calculated based on the target motor speed Msp*.

The FF term correction unit 67 corrects the FB duty D_fb with the FF duty D_ff to calculate a duty command value. The FF term correction unit 67 according to the present embodiment is an adder, and adds the FF duty D_ff to the FB duty D_fb to calculate a corrected FB duty Da.

In the feedback control of the present embodiment, magnitudes of currents and torques flowing through the coils 111 to 113 and 121 to 123 can be changed by changing the duty by PWM control or the like. According to the present embodiment, the drive of the motor 10 is controlled by a rectangular wave control by 120° energization. In the rectangular wave control by 120° energization, the switching element on a high potential side of the first phase and the switching element on a low potential side of the second phase are turned on. Further, the energization phase is switched by switching the combination of the first phase and the second phase at every electrical angle of 60°. As a result, a rotating magnetic field is generated in the winding sets 11 and 12, and the motor 10 rotates. In the present embodiment, the rotation direction of the motor 10 when the output shaft 15 is rotated in the forward rotation direction is defined as the forward direction. In addition, the duty when the motor 10 outputs a positive torque is assumed to be positive, the duty when the motor 10 outputs a negative torque is assumed to be negative, and an available duty range is assumed to fall within −100[%] to 100[%]. In other words, when the motor 10 is rotated in the forward direction, the duty is set to be positive, and when the motor 10 is rotated in the reverse direction, the duty is set to be negative. When a braking torque (that is, a negative torque) is generated in order to stop the motor 10 which is rotating in the positive direction, the rotation direction of the motor 10 is the forward rotation direction, but the duty is negative. Similarly, the duty is positive when the braking torque is generated to stop the motor 10 that is rotating reversely.

Figure 7:
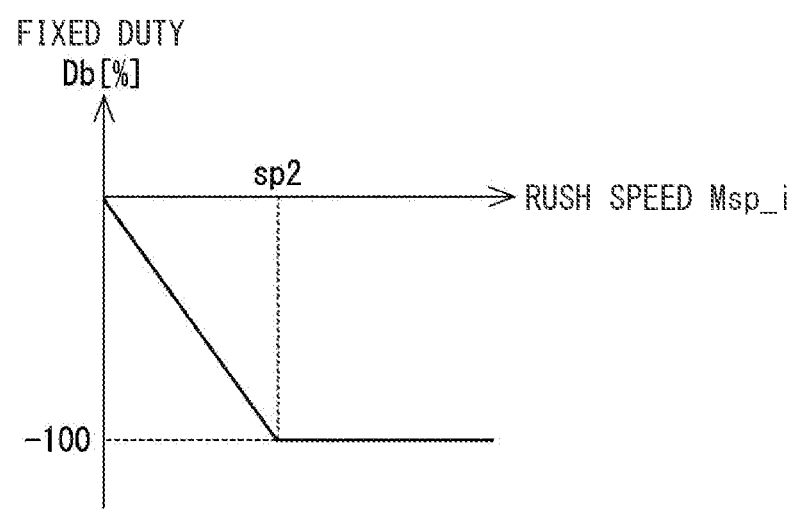
FIG. 7 is an illustrative diagram illustrating a fixed duty according to the first embodiment.

The sudden braking duty calculation unit 70 calculates the fixed duty Db, which is a duty at the time of the sudden braking control, in accordance with a rush speed Msp_i, which is a motor speed Msp at the time of the start of the sudden braking control, that is, when the angle deviation e becomes smaller than the angle determination threshold e_th. As shown in FIG. 7, the fixed duty Db when the motor 10 is rotating in the forward direction is a negative value, and when the rush speed Msp_i is smaller than the predetermined speed sp2, the absolute value is larger as the rush speed Msp_i is larger, and when the rush speed Msp_i is equal to or larger than the predetermined speed sp2, the fixed duty Db is −100[%].

The first switching control unit 71 switches whether the duty used for signal generation is the corrected FB duty Da or the fixed duty Db. In the present embodiment, when the angle deviation e is equal to or larger than the angle determination threshold e_th, the FB duty after correction Da is selected, and when the angle deviation e is smaller than the angle determination threshold e_th, the fixed duty Db is selected as the duty used for signal generation, and is output to the voltage correction unit 72. The voltage correction unit 72 corrects the selected corrected FB duty Da or fixed duty Db with the battery voltage V, and calculates a duty command value. The PWM signal generation unit 73 generates a command signal Spwm related to switching of the switching elements 411 to 416 and 421 to 426 based on the duty command value and the actual count value Cen. In addition, the PWM signal generation unit 73 adjusts the command signal Spwm so that the motor current Im does not exceed a current limit value Em-max.

The stationary phase energization control unit 75 performs stationary phase energization control. The stationary phase energization control is a control for stopping the rotation of the motor 10, and selects a stationary phase corresponding to an electric angle, and generates command signals Sfix related to switching of the switching elements 411 to 416 and 421 to 426 so that a current flows in a predetermined direction of the selected stationary phase. As a result, an excitation phase is fixed. When the excitation phase is fixed, the motor 10 stops at a predetermined electrical angle corresponding to the excitation phase. The stationary phase energization control unit 75 selects the stationary phase and the energization direction based on the actual count value Cen so as to stop the motor 10 at an electric angle closest from the current rotor position. In the stationary phase energization control, the duty is gradually changed after the lapse of a duty fixing time Tf from the start of the stationary phase energization control. Specifically, an absolute value of the duty is decreased so that the motor current Im after the lapse of a stationary phase energization duration Ta becomes 0.

The reverse determination unit 76 determines whether or not the rotation of the motor 10 has been reversed based on the actual count value Cen. The second switching control unit 77 switches the signals output to the motor drivers 41 and 42. In the present embodiment, when the motor 10 is rotating in the rotational direction corresponding to the requested shift range, that is, before the motor 10 is reversed, the second switching control unit 78 selects the command signal Spwm generated by the PWM signal generation unit 73, and when the motor 10 is reversed, the second switching control unit 78 selects the command signal Sfix generated by the stationary phase energization control unit 75. The selected command signal is output to the motor drivers 41 and 42.

Now, the control modes of the motor 10 are summarized. Mode 1 is an "acceleration control" and accelerates the rotation of the motor 10. Mode 2 is a "steady-state control" in which the rotation speed of the motor 10 is kept substantially constant. Mode 3 is a "deceleration control" for decelerating the rotation of the motor 10. Mode 4 is a "sudden braking control" and suddenly brakes the rotation of the motor 10. Mode 5 is a "stationary phase energization control" and stops the motor 10. Mode 0 is an "energization off", and stops the energization to the motor 10.

Figure 8:
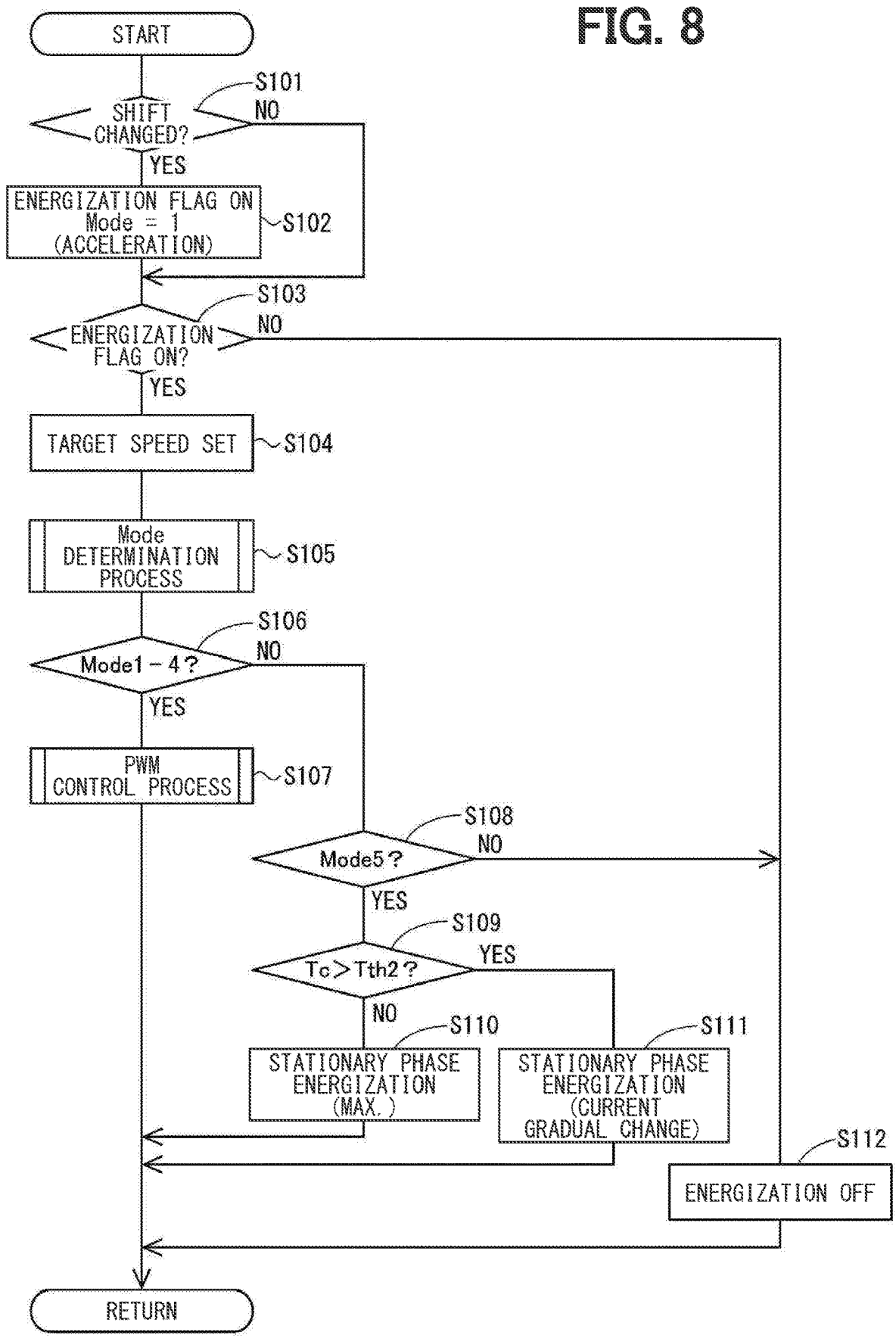
FIG. 8 is a flowchart illustrating a motor control process according to the first embodiment.

The motor control process will be described with reference to a flowchart of FIG. 8. This processing is executed in a predetermined cycle by the ECU 50 during a period during which a start switch, which is an ignition switch or the like, is turned on. Hereinafter, the "Step" of Step S101 is omitted, and a symbol "S" is simply referred to. The same applies to the other steps.

In a first S101, the ECU 50 determines whether or not a shift lever (not shown) is operated by the driver and the driver requested shift range is changed. If it is determined that the driver requested shift range has not changed (NO in S101), the process proceeds to S103. If it is determined that the driver requested shift range has changed (YES in S101), the process proceeds to S102.

In S102, the ECU 50 turns on an energization flag for the motor 10. Further, the ECU 50 sets the control state to the mode 1 which is the acceleration control. In S103, the ECU 50 determines whether or not the energization flag is turned on. When it is determined that the energization flag is off (NO in S103), the process shifts to S112. When it is determined that the energization flag is on (YES in S103), the process shifts to S104. In S104, the target speed setting unit 62 sets the target motor speed Msp*. In S105, the ECU 50 performs a mode determination process.

Figure 9:
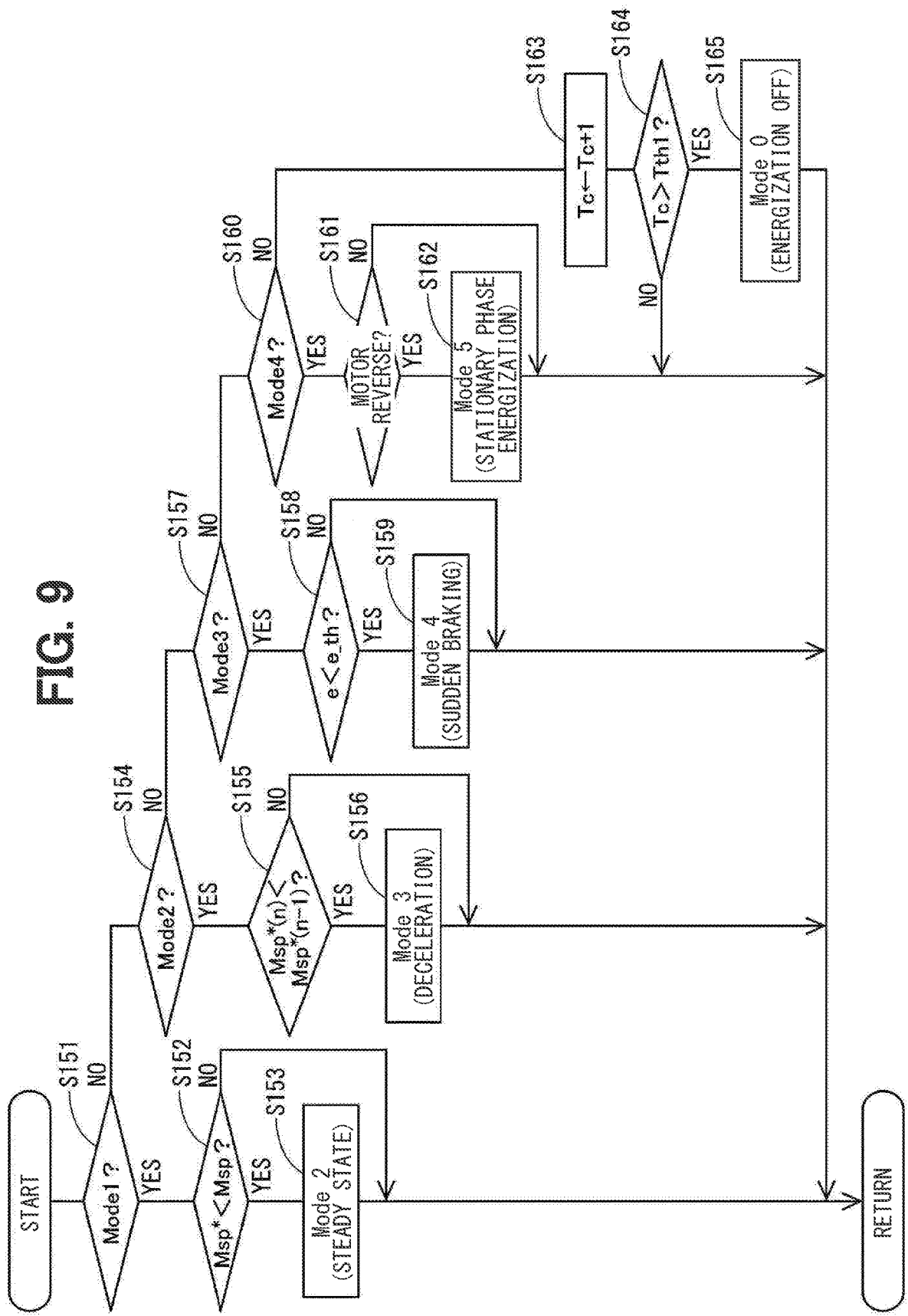
FIG. 9 is a flowchart illustrating a mode determination process according to the first embodiment.
Figure 10:
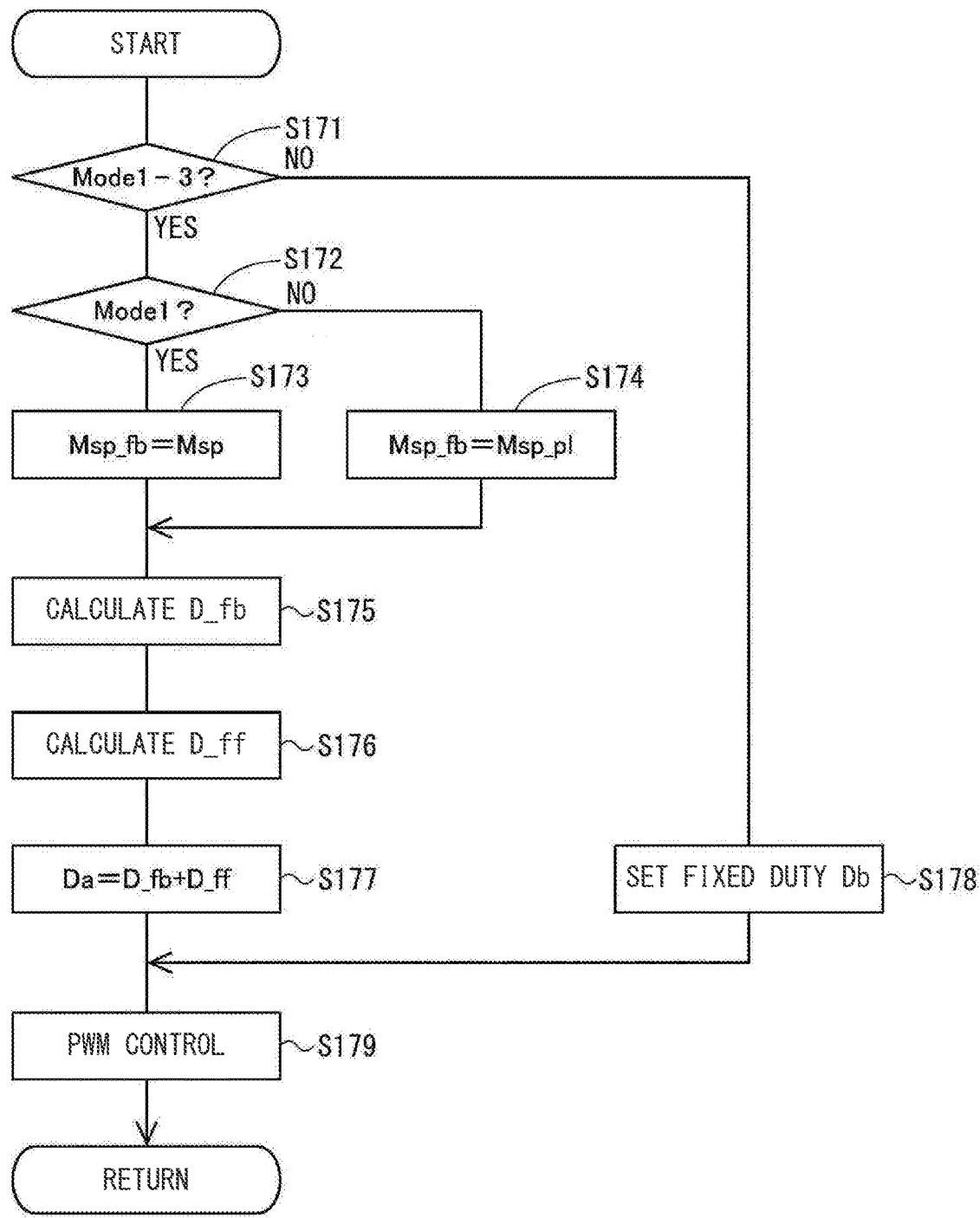
FIG. 10 is a flowchart illustrating a PWM control process according to the first embodiment.

The mode determination process will be described with reference to FIG. 9. In S151, the ECU 50 determines whether or not the control mode is the mode 1. When it is determined that the control mode is not the mode 1 (NO in S151), the process shifts to S154. When it is determined that the control mode is the mode 1 (YES in S151), the process shifts to S152.

In S152, the ECU 50 determines whether or not the target motor speed Msp* is lower than the present motor speed Msp. When it is determined that the target motor speed Msp* is equal to or higher than the present motor speed Msp (NO in S152), the mode 1 is continued. If it is determined that the target motor speed Msp* is lower than the present motor speed Msp (YES in S152), the process proceeds to S153. In S153, the ECU 50 sets the control mode as the mode 2, which is the steady-state control.

In S154 when the control mode is determined not to be the mode 1 (NO in S151), the ECU 50 determines whether the control mode is the mode 2 or not. When it is determined that the control mode is not the mode 2 (NO in S154), the process shifts to S157. When it is determined that the control mode is the mode 2 (YES in S154), the process shifts to S155.

In S155, the ECU 50 determines whether or not the current value Msp*(n) of the target motor speed is smaller than the previous value Msp* (n−1). When it is determined that the Msp*(n) of the target motor speed is equal to or higher than the previous value Msp*(n−1) (NO in S155), the mode 2 is continued. When it is determined that the Msp*(n) of the target motor speed is smaller than the previous value Msp*(n−1) (YES in S155), the process proceeds to S156. In S156, the ECU 50 sets the control mode as the mode 3, which is the deceleration control.

In S157 when it is determined that the control mode is not the modes 1 and 2 (NO in S154), the ECU 50 determines whether the control mode is the mode 3 or not. When it is determined that the control mode is not the mode 3 (NO in S157), the process shifts to S160. When it is determined that the control mode is the mode 3 (YES in S157), the process shifts to S158.

In S158, the ECU 50 determines whether or not the angle deviation e is smaller than the angle determination threshold e_th. When it is determined that the angle deviation e is equal to or larger than the angle determination threshold e_th (NO in S158), the mode 3 is continued. When it is determined that the angle deviation e is smaller than the angle determination threshold e_th (YES in S158), the process proceeds to S159. In S159, the ECU 50 sets the control mode as the mode 4, which is the sudden braking control.

In S160 when it is determined that the control mode is not the mode 1 to the mode 3 (NO in S157), the ECU 50 determines whether the control mode is the mode 4, or not. When it is determined that the control mode is not the mode 4 (NO in S160), the process shifts to S163. When it is determined that the control mode is the mode 4 (YES in S160), the process shifts to S161.

In S161, the ECU 50 determines whether or not the motor 10 has been reversed by the reverse determination unit 76. In this example, when the motor 10 rotates in a direction opposite to the rotation direction determined based on the ranges before and after the shift range is switched, it is determined that the motor 10 has been reversed. When it is determined that the motor 10 has not been reversed (NO in S161), the mode 4 is continued. When it is determined that the motor 10 has been reversed (YES in S161), the process proceeds to S162. In S162, the ECU 50 sets the control mode to the mode 5 which is the stationary phase energization control.

When it is determined that the control mode is not the modes 1 to 4 (NO in S160), in S163 where the control mode is the mode 5, the ECU 50 increments the timer value Tc, which is the count value of the timer for counting the duration of the stationary phase energization control. In S164, the ECU 50 determines whether or not the timer value Tc is larger than a duration determination threshold Tth1. The duration determination threshold Tth1 is a value set in accordance with the stationary phase energization duration Ta (for example, 100 ms) during which the stationary phase energization control is continued. When it is determined that the timer value Tc is equal to or smaller than the duration determination threshold Tth1 (NO in S164), the mode 5 is continued. When it is determined that the timer value Tc is larger than the duration determination threshold Th1 (YES in S164), the process proceeds to S165. In S165, the ECU 50 sets the control mode to the mode 0 which is the energization off control.

Returning to FIG. 8, in S106 of shifting to the mode determination process, the ECU 50 determines whether or not the control mode is any one of the modes 1 to 4. When the control mode is the modes 1 to 4, the motor 10 is PWM-controlled. When it is determined that the control mode is other than the modes 1 to 4 (NO in S106), the process shifts to S108. If it is determined that the control mode is any one of the modes 1 to 4 (YES in S106), the process shifts to S107.

In S107, the ECU 50 controls the drive of the motor 10 by a PWM-control. The PWM control process will be described with reference to FIG. 10. In S171, the ECU 50 determines whether or not the control mode is one of the modes 1 to 3. When the control mode is the modes 1 to 3, the motor 10 is feedback-controlled. When it is determined that the control mode is not the mode 1 to the mode 3, that is, is the mode 4 (NO in S171), the process shifts to S178. When it is determined that the control mode is one of the modes 1 to 3 (YES in S171), the process shifts to S172.

In S172, the ECU 50 determines whether or not the control mode is the mode 1. When it is determined that the control mode is the mode 1 (YES in S172), the process shifts to S173. If it is determined that the control mode is not the mode 1, that is, is the mode 2 or the mode 3 (NO in S172), the process shifts to S174.

In S173, the feedback value setting unit 63 outputs the motor speed Msp as the speed feedback value Msp_fb to the speed deviation calculation unit 64. In S174, the feedback value setting unit 63 outputs the phase advance compensation value Msp_pl of the motor speed Msp as the speed feedback value Msp_fb to the speed deviation calculation unit 64.

In S175, the controller 65 calculates the feedback duty D_fb. In S176, the feedforward correction value calculation unit 66 calculates the feedforward duty D_ff according to the control modes. In S177, the feedforward term correction unit 67 adds the feedback duty D_fb and the feedforward duty D_ff to calculate the corrected feedback duty Da.

In S178 in which the control mode shifts to the mode 4 (NO in S171), the sudden braking duty calculation unit 70 sets the fixed duty Db in accordance with the rush speed Msp_i. When the fixed duty Db is set, the set value is maintained. In S179, the PWM signal generation unit 73 generates the command signal Spwm based on the calculated corrected feedback duty Da or the fixed duty Db. The ECU 50 controls the drive of the motor 10 based on the generated command signal Spwm.

Returning to FIG. 8, in S108 where the control mode is determined to be other than the modes 1 to 4 (NO in S106), the ECU 50 determines whether or not the control mode is the mode 5. If it is determined that the control mode is not the mode 5, that is, is the mode 0 (NO in S108), the process shifts to S112. When it is determined that the control mode is the mode 5 (YES in S108), the process shifts to S109.

In S109, the ECU 50 determines whether or not the timer value Tc is larger than a fixing determination threshold Tth2. The fixing determination threshold Tth2 is set in accordance with the duty fixing time Tf (for example, 20 ms) during which the maximum duty is continued by the stationary phase energization. The duty fixing time Tf is shorter than the stationary phase energization duration Ta. When it is determined that the timer value Tc is equal to or smaller than the fixing determination threshold Tth2 (NO in S109), the process proceeds to S110. When it is determined that the timer value Tc is larger than the fixing determination threshold Tth2 (YES in S109), the process proceeds to S111.

In S110, the stationary phase energization control unit 75 generates the command signal Sfix for energizing the stationary phase corresponding to the actual count value Cen at a maximum duty. The ECU 50 controls the drive of the motor 10 based on the generated command signals Sfix. In S111, the stationary phase energization control unit 75 generates the command signal Sfix for energizing the stationary phase corresponding to the actual count value Cen at a duty set so that the current becomes gradually smaller so that a current when the stationary phase energization duration Ta elapses is set to 0. The ECU 50 controls the drive of the motor 10 based on the generated command signals Sfix.

In S112 shifted when it is determined that the energization flag is OFF (NO in S103), or when it is determined that the control mode is not the modes 1 to 5, that is, it is determined that the control mode is the mode 0 (NO in S108), the ECU 50 turns off the energization of the motor 10. When the energization of the motor 10 is off, an off-state is continued. In addition, the energization flag is turned off.

Figure 11:
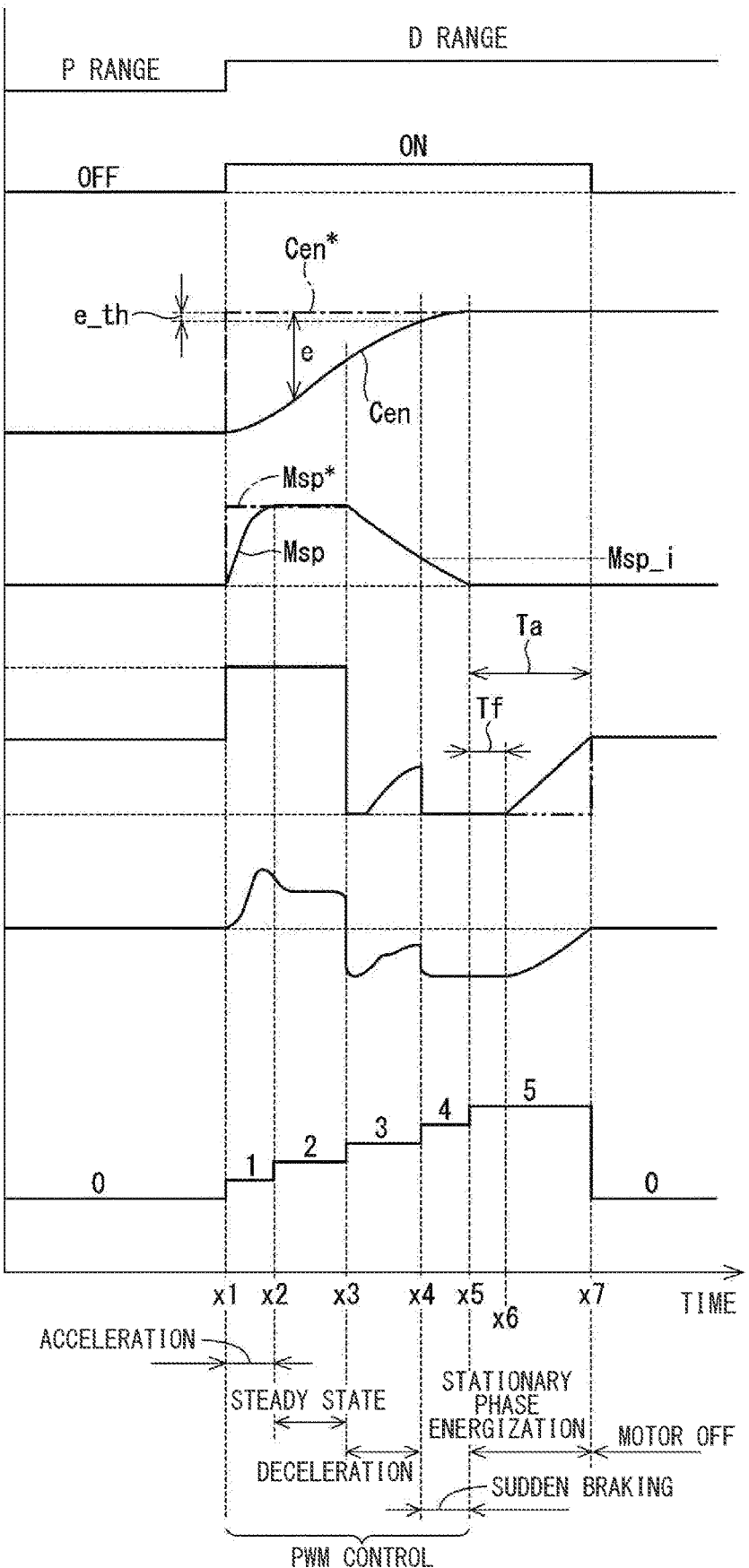
FIG. 11 is a time chart illustrating a motor control process according to the first embodiment.

The motor control process will be described based on a time chart shown in FIG. 11. FIG. 11 shows the driver requested shift range, the energization flag, the angle of the motor 10, the motor speed, the duty, the motor current, and the control mode from a top, with the common time axis as the horizontal axis. In FIG. 11, an angle of the motor 10 is indicated by a count value of the encoder 13. The same applies to FIG. 13.

As shown in FIG. 11, when the driver requested shift range is maintained in the P range before the time x1, the control state of the motor 10 is set to the energization off control of the mode 0. At the time x1, when the driver requested shift range changes from the P range to the D range, the energization flag is turned on, and the control state is switched to the acceleration control of the mode 1. Further, the target count value Cen* is set in accordance with the driver requested shift range. In the acceleration control, the ECU 50 drives the motor 10 by the PWM control at the maximum duty. Further, in the acceleration control, the motor speed Msp for which the phase advance compensation is not performed is fed back.

When the motor speed Msp becomes higher than the target motor speed Msp* at a time x2, the control state is switched to the steady-state control of the mode 2. In the steady-state control, the phase advance compensation value Msp_pl, which is a value subjected to the phase advance compensation, is fed back. At the time x3, when the target motor speed Msp* falls, the control state is switched to the deceleration control of the mode 3. In the present embodiment, the phase advance compensation value Msp_pl subjected to the phase advance compensation is fed back in a steady state and a deceleration state in which hunting is apt to occur due to the detection delay of the rotation angle and the resolution of the detection. As a result, hunting in the steady state and the deceleration state is reduced.

At a time x4 when the angle deviation e becomes smaller than the angle determination threshold e_th, the control mode is switched to the sudden braking control of the mode 4. At the time of the sudden braking control, the drive of the motor 10 is controlled based on the fixed duty Db set in accordance with the rush speed Msp_i. The overshoot can be reduced by performing the sudden braking control. The drive of the motor 10 is controlled by the PWM control during a period from the time x1 to a time x5 at which the control shifts to the stationary phase energization control.

When the reverse of the motor 10 is determined at the time x5, the control mode is switched to the stationary phase energization control of the mode 5. In the present embodiment, the stationary phase energization control is continued from the time x5 until a time x7 at which the stationary phase energization duration Ta elapses. As a result, the motor 10 can be appropriately stopped.

Since the motor 10 is a spring mass system, as indicated by a two-dot chain line, when the energization is turned off at a time x7 after the energization of the stationary phase is continued at the maximum duty for the stationary phase energization duration Ta, the motor shaft is suddenly released to generate vibration. When the motor shaft is driven by the vibration, the output shaft 15 may also be driven.

Therefore, in the present embodiment, the stationary phase energization is performed at the maximum duty in the first period from the start of the stationary phase energization to the time x6 at which the duty fixing time Tf elapses. In addition, in the second period until the stationary phase energization duration Ta is reached after the duty fixing time Tf has elapsed in the stationary phase energization control, that is, in the second period from the time x6 to the time x7, the duty is slowly changed to 0 so that the motor current Im at the time x7 at which the stationary phase energization duration Ta ends is 0. In FIG. 11, the duty is linearly gradually changed, but may be non-linearly gradually changed or stepwise gradually changed. As a result, the vibration of the motor shaft at the time of switching from the energization of the stationary phase to the energization off is reduced, and a state in which the motor shaft and the output shaft 15 are stopped can be appropriately maintained at the energization off time.

As described above, the shift range control device according to the present embodiment switches the shift range by controlling the drive of the motor 10, and includes the first switching control unit 71, the reverse determination unit 76, and the second switching control unit 77. When the angle deviation e, which is the difference between the target count value Cen* and the actual count value Cen, becomes smaller than the angle determination threshold e_th, the first switching control unit 71 switches from the feedback control to the control with the fixed duty Db. The fixed duty Db of the present embodiment is a sudden braking duty that stops the rotation of the motor 10. More specifically, if the duty at the time of the acceleration control or the steady-state control after the start of feedback control is positive, the fixed duty Db is negative. Thus, the fixed duty Db is opposite in positive and negative to the duty at the time of rotating the motor 10 in accordance with the switching direction of the requested shift range.

The reverse determination unit 76 determines that the motor 10 has been reversed. When it is determined that the motor 10 is reversed, the second switching control unit 77 switches the control from the control with the fixed duty Db to the stationary phase energization control for energizing the stationary phase of the motor 10. This makes it possible to improve the responsiveness, reduce the overshoot, and appropriately stop the motor 10 at the target position.

The fixed duty Db is set according to the rush speed Msp_i which is the rotation speed of the motor 10 when it is determined that the angle deviation e is smaller than the angle determination threshold e_th. As a result, the overshoot can be reduced in accordance with the motor speed Msp, and the motor 10 can be stopped appropriately at the target position.

The shift range control device 40 turns off the energization when the stationary phase energization duration Ta has elapsed from the start of the stationary phase energization control. The stationary phase energization control is continued over the stationary phase energization period T1, thereby being capable of reliably stopping the motor 10. Further, a power consumption can be reduced by turning off the energization after the stationary phase energization duration period Ta has elapsed.

In the period during which the stationary phase energization control is continued, the duty in the first period until the duty fixing time Tf which is a predetermined time elapses is set to be constant, and the duty is gradually changed so that the current of the motor 10 approaches 0 in the second period from the elapse of the duty fixing time Tf to the end of the stationary phase energization control. This makes it possible to reduce the vibration of the motor shaft at the time of switching from the stationary phase energization control to the energization off, and also makes it possible to maintain the state in which the output shaft 15 is stopped at a desired position even at the time of the energization off.

Second Embodiment

Figure 12:
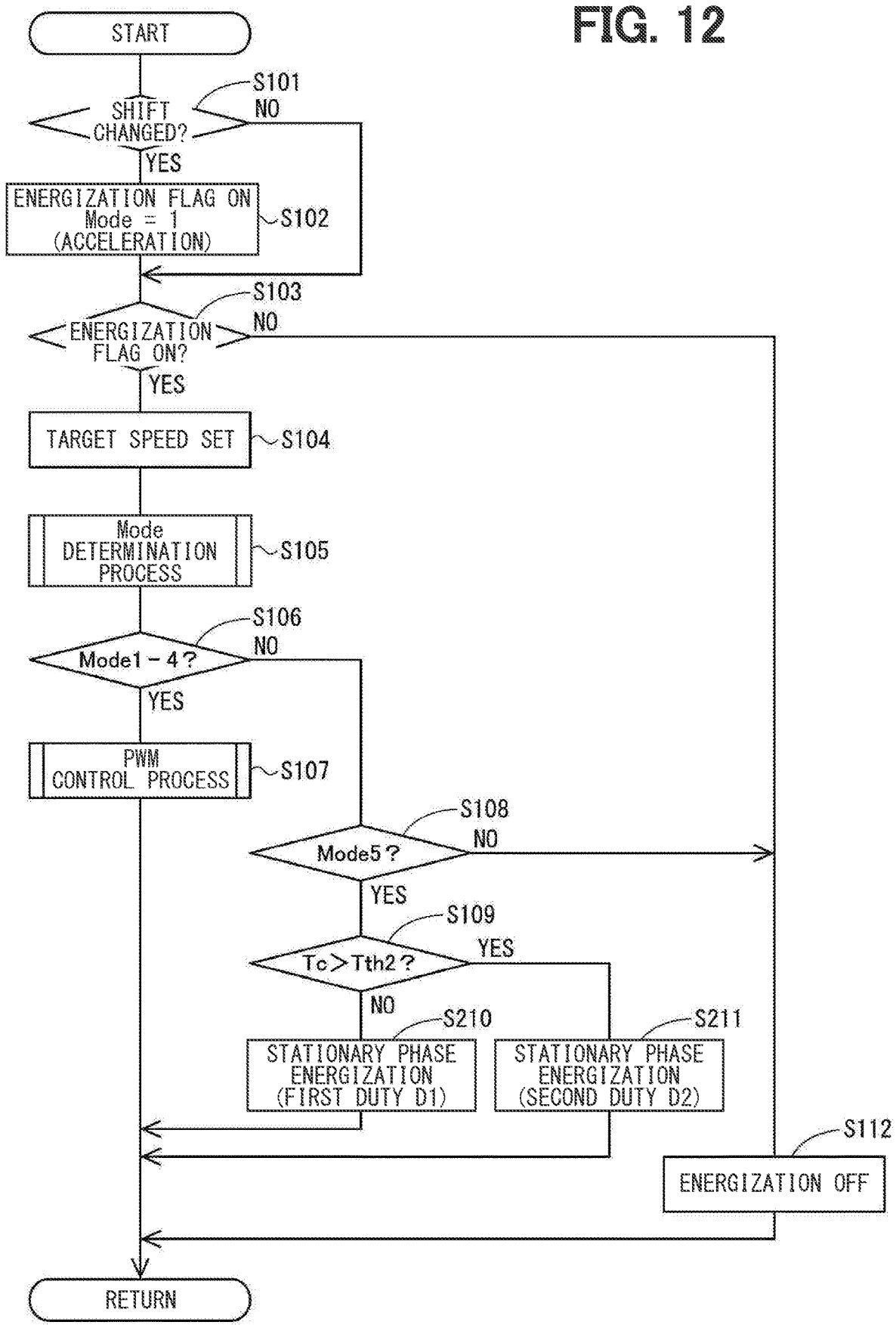
FIG. 12 is a flowchart illustrating a motor control process according to a second embodiment.
Figure 13:
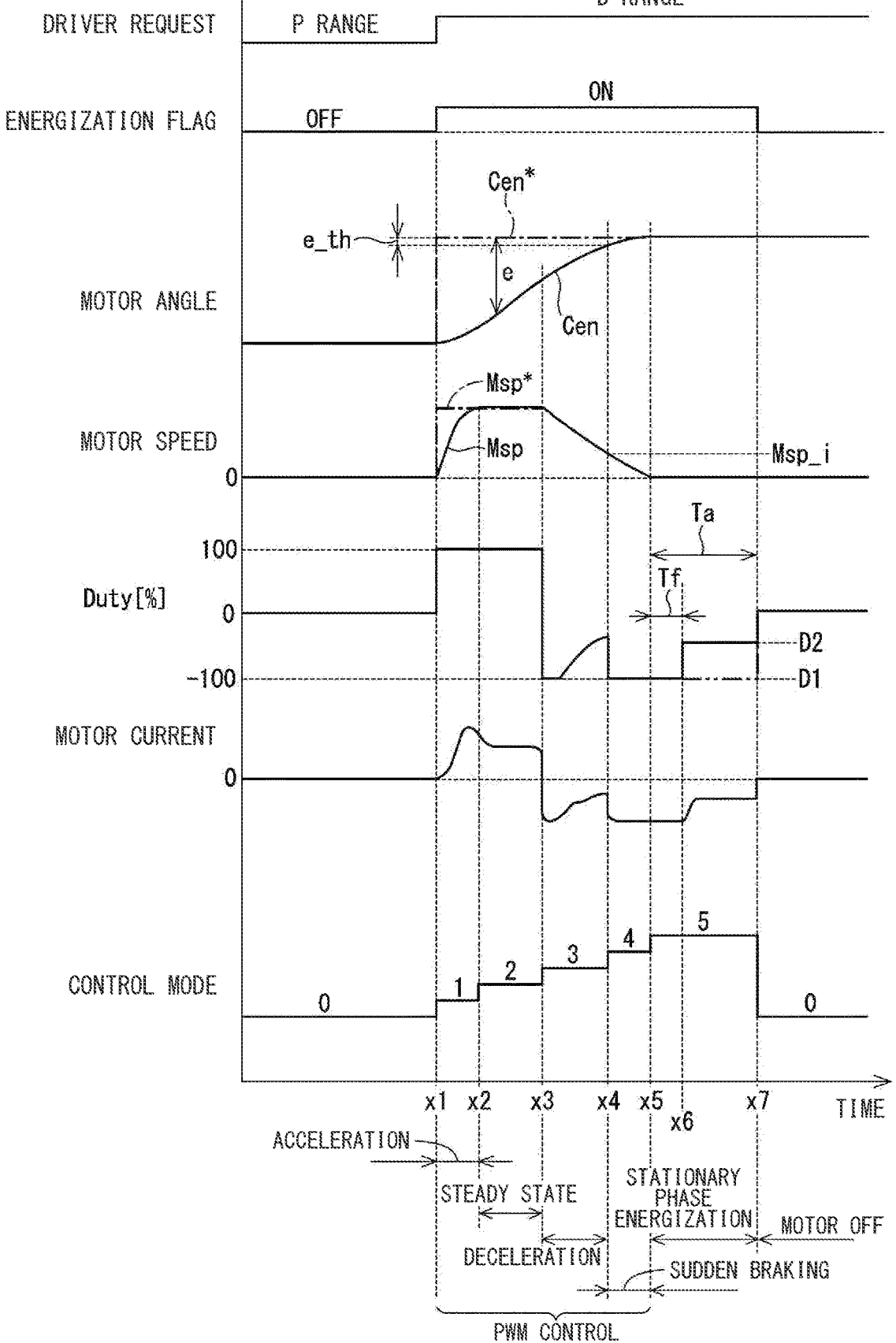
FIG. 13 is a time chart illustrating a motor control process according to a third embodiment.

A second embodiment is shown in FIGS. 12 and 13. In the present embodiment, since a stationary phase energization control is different from that in the embodiment described above, the difference will be mainly described, and a description of other portions will be omitted. FIG. 12 is a flowchart illustrating a motor control process according to the present embodiment. FIG. 12 is similar to FIG. 8 except that S210 and S211 are substituted for S110 and S111 shifted from S109.

If it is determined in S109 that a timer value Tc is equal to or smaller than a fixing determination threshold Tth2 (NO in S109), the process proceeds to S210. In S210, a stationary phase energization control unit 75 generates a command signal Sfix for energizing a stationary phase corresponding to an actual count value Cen with a first duty D1. In the present embodiment, the first duty D1 is, for example, −100[%], which is the maximum duty. The ECU 50 controls the drive of the motor 10 based on the generated command signals Sfix.

If it is determined in S109 that the timer value Tc is larger than a fixing determination threshold Tth2 (YES in S109), the process proceeds to S211. In S211, the stationary phase energization control unit 75 generates the command signal Sfix for energizing the stationary phase corresponding to the actual count value Cen at a second duty D2 having the same reference numeral as that of the first duty D1 and a smaller absolute value than that of the first duty D1 in order to reduce the current than before the lapse of a duty fixing time Tf. The second duty D2 is an arbitrary predetermined value (for example, −30[%]). The ECU 50 controls the drive of the motor 10 based on the generated command signals Sfix.

FIG. 13 is a time chart illustrating the motor control process according to the present embodiment. The processing up to a time x6 is the same as that of the first embodiment. As shown in FIG. 13, in the stationary phase energization control, the stationary phase energization is performed at the first duty D1, which is the maximum duty, in a first period until the time x6 at which the duty fixing time Tf elapses. Further, in a second period since the duty fixing time Tf elapses in the stationary phase energization control until a stationary phase energization duration Ta is reached, that is, in the second period from the time x6 to the time x7, the stationary phase energization control is performed with the second duty D2 having an absolute value smaller than that of the first duty D1. With a change from the first duty D1 to the second duty D2, the motor current Im in the second period becomes smaller than that in the first period, and therefore, the vibration of the motor shaft when switching to the energization off state can be reduced as compared with the case of continuing energization in the first duty D1.

In the present embodiment, the duty in the first period until the duty fixed time Tf, which is a predetermined time, elapses in the period during which the stationary phase energization control is continued is set as the first duty D1, and the second duty D2, which is smaller in absolute value than the first duty D1, is set in the second period from the elapse of the duty fixing time Tf to the end of the stationary phase energization control. This makes it possible to reduce the vibration of the motor shaft at the time of switching from the stationary phase energization control to the energization off, and also makes it possible to maintain the state in which the output shaft 15 is stopped at a desired position even at the time of the energization off.

Other Embodiments

In the embodiment described above, the motor is a three-phase brushless motor of a permanent magnet type. In another embodiment, the motor may be any motor capable of switching between the feedback control and the stationary phase energization control. In the embodiment described above, the motor is provided with the two winding sets. In another embodiment, the winding sets of the motor may be one set or three or more sets. In the embodiment described above, in the feedback control, the rectangular wave control by the 120° energization is performed. In another embodiment, in the feedback control, the rectangular wave control may be performed by energization at 180°. Further, the present disclosure is not limited to the rectangular wave control, and a PWM control may be performed by a triangular wave comparison method or an instantaneous vector selection method.

In the embodiment described above, an encoder is used as the rotation angle sensor for detecting the rotation angle of the motor. In another embodiment, the rotation angle sensor is not limited to the encoder, and any sensor such as a resolver may be used. Instead of the count value of the encoder, a value other than the encoder count value which can be converted into the rotation angle of the motor may be fed back. The same applies to the selection of the stationary phase in the stationary phase energization control.

In the embodiment described above, when the speed state is the steady-state control or the deceleration control, the phase advance value subjected to the phase advance filtering process is fed back. In another embodiment, the value obtained by performing a phase advance filtering process may be fed back even when the speed state is the acceleration control. In addition, the phase advance filtering process in at least one of the steady state and the deceleration state may be omitted. The determination method of the speed state is not limited to the method of the above embodiment, and any method may be used, for example, the determination using a differential value of the motor speed.

In the embodiment described above, one angle determination threshold is used to determine switching from the feedback control to the sudden braking control with a fixed duty. In other embodiments, the angle determination threshold may be variable according to the motor speed, for, example, the angle determination threshold is increased more as the motor speed is increased more. In the embodiment described above, the fixed duty in the sudden braking control is set according to the rush speed. In another embodiment, the fixed duty may be a predetermined value (for example, a maximum duty) regardless of the rush speed.

In the embodiment described above, in the stationary phase energization control, the duty until the duty fixing time elapses is the maximum duty. In another embodiment, the duty until the duty fixing time in the stationary phase energization control elapses may not be the maximum duty.

In another embodiment, the duty change processing in the stationary phase energization control may be omitted, and the duty during the stationary phase energization may be kept constant.

In the embodiment described above, the detent plate is provided with four recess portions. In another embodiment, the number of recess portions is not limited to four and may be any number. For example, two recess portions of the detent plate may be used to switch between the P range and the NotP range. The shift range switching mechanism, the parking lock mechanism, and the like may be different from those of the embodiment described above.

As described above, the present disclosure is not limited to the embodiments described above, and can be implemented in various forms without departing from the spirit of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A shift range control device that switches a shift range by controlling a driving operation of a motor, the shift range control device comprising:
   a first switching control unit that switches from a feedback control to a control with a fixed duty when a difference between a target angle at which the motor is to be stopped and an actual angle becomes smaller than an angle determination threshold;
   a reverse determination unit that determines whether the motor reverses; and
   a second switching control unit that switches from the control with the fixed duty to a stationary phase energization control for energizing a stationary phase of the motor when the reverse determination unit determines that the motor reverses.

2. The shift range control device according to claim 1, wherein:
   the fixed duty is set according to a rotation speed of the motor when it is determined that the difference between the target angle and the actual angle is smaller than the angle determination threshold.

3. The shift range control device according to claim 1, wherein:
   energization is turned off when a stationary phase energization duration elapses since the stationary phase energization control starts.

4. The shift range control device according to claim 3, wherein:
   in a period during which the stationary phase energization control is continued, a duty in a first period until a predetermined time elapses is constant, and the duty is gradually changed so that a current of the motor approaches zero in a second period from an elapse of the predetermined time to an end of the stationary phase energization control.

5. The shift range control device according to claim 3, wherein:
   in a period during which the stationary phase energization control is continued, a duty in a first period until a predetermined time elapses is set to be a first duty, and the duty in a second period from an elapse of the predetermined period to an end of the stationary phase energization control is set to be a second duty having an absolute value smaller than the first duty.

6. A shift range control device that switches a shift range by controlling a driving operation of a motor, the shift range control device comprising:
   a first switch that switches from a feedback control to a control with a fixed duty when a difference between a target angle at which the motor is to be stopped and an actual angle becomes smaller than an angle determination threshold;
   a processor unit that determines whether the motor reverses; and
   a second switch that switches from the control with the fixed duty to a stationary phase energization control for energizing a stationary phase of the motor when the processor determines that the motor reverses.

* * * * *